United States Patent [19]
Hutchinson

[11] 3,845,627
[45] Nov. 5, 1974

[54] POWER GENERATION FROM HOT BRINES

[75] Inventor: Arthur J. L. Hutchinson, Pasadena, Calif.

[73] Assignee: Geothermal Investment Co., Pasadena, Calif.

[22] Filed: Dec. 10, 1973

[21] Appl. No.: 423,192

Related U.S. Application Data

[63] Continuation-in-part of Ser. No. 301,057, Oct. 26, 1972, abandoned.

[52] U.S. Cl. .................... 60/641, 60/651, 60/655, 165/45
[51] Int. Cl. .................. F03g 7/00, F01k 25/00
[58] Field of Search .................. 60/641, 651, 655

[56] References Cited
UNITED STATES PATENTS

| | | | |
|---|---|---|---|
| 3,274,769 | 9/1966 | Reynolds | 60/26 |
| 3,470,943 | 10/1969 | Van Huisen | 60/26 |

Primary Examiner—Irwin C. Cohen
Assistant Examiner—Allen M. Ostrager
Attorney, Agent, or Firm—Christie, Parker & Hale

[57] ABSTRACT

Hot fluid which may contain salts and other dissolved minerals is passed through a direct contact heat exchanger in heat exchange relationship with a heating fluid that has a specific gravity sufficiently below the specific gravity of the hot fluid that it may pass from the bottom to the top of the heat exchanger chamber in contact with the hot fluid. The pressure of the chamber is maintained above the vapor pressure of the hot fluid at the entering temperature of the fluid. The heat transfer fluid is selected so that the salts and other minerals in the fluid are insoluble in the heated heat transfer fluid. The heated heat transfer fluid is passed in heat exchange relationship with a working fluid that is vaporized in the heat exchangers and is subsequently passed through a power extracting gas expansion device. Alternatively, an oily substance is added to the hot fluid which may contain salts and other dissolved minerals, and the composition is passed through one or more surface contact heat exchangers for heating a a working fluid. The oily substance coats the surface of the exchangers to prevent any mineral deposition.

20 Claims, 4 Drawing Figures

POWER GENERATION FROM HOT BRINES

CROSS REFERENCE TO RELATED APPLICATIONS

This application is a continuation-in-part of my copending application Ser. No. 301,057 filed Oct. 26, 1972, entitled "Power Generation from Hot Brines" now abandoned.

BACKGROUND OF THE INVENTION

1. Field of the Invention

This invention relates to extraction of useful energy from hot fluids which may contain salts and other dissolved minerals.

It is known that the interior of the earth is a molten mass of rocks and is very hot. This geothermal heat energy may advantageously and efficiently be employed as a primary source of energy for the generation of power through fluid as a carrier. The fluid may be steam released from volcanic areas or hot water which is present in volcanic and in deep alluvial deposits that are porous enough to permit percolation of water to the deep hot zones. This water may have a temperature as high as 700°F. at a depth of 5,000 feet.

2. Description of the Prior Art

In areas where steam alone is produced, the steam may be used directly in turbines to drive generators to generate electricity. Where there is a mixture of steam and hot water, the steam may be separated in a flash chamber and then used in a steam turbine. However, the steam and the hot water generally contain corrosive materials that can cause destruction of the critical and expensive parts of the rotating machinery employed to convert the energy of the steam and hot water into mechanical and/or electrical energy.

As an efficient way of utilizing hot fluid which may contain salts and other dissolved minerals, especially hot fluids from a geothermal well, a working fluid may be superheated by passing the working fluid in heat exchange relationship with the hot fluid. The working fluid advantageously has a boiling point that is below the boiling point of the hot fluid and also has a specific heat as a vapor that is at least 50 percent of the specific heat as a liquid under the operating pressures of the system and over the temperature range permitted when using the hot fluid as the heat source. This method and apparatus for utilizing the hot fluid as a primary source of energy is disclosed in my copending application Ser. No. 301,056, filed Oct. 26, 1972, and represents an efficient way for generating power from hot fluids.

However, there are some hot fluids that contain such a degree of salts and other dissolved minerals that this method may not be useful over a long period of time. For example, it is known that the water from some of the geothermal wells in the Imperial Valley in California have more than 400,000 parts per million of solids which include salts and other dissolved minerals. The continuous passage of such water through a heat exchanger can result in the deposit of silica or other types of scale with a substantial decrease in the heat transfer efficiency within the heat exchanger.

SUMMARY OF THE INVENTION

In accordance with this invention, hot fluids that may contain salts and other dissolved minerals are passed in heat exchange relationship by direct contact with a heat transfer fluid, with the heat transfer fluid thereafter passing through heat exchangers to give up heat to a working fluid in a separate system. The heat transfer fluid advantageously has a specific gravity below that of the hot fluid so that the heat transfer fluid will rise in a chamber in which the hot fluid is passing from the top to the bottom at the operating pressures of the system. Additionally, the heat transfer fluid advantageously has a boiling point above that of the hot fluid and the pressure within the direct contact heat exchanger is maintained above the pressure at which the hot fluid can vaporize at the temperature at which the hot fluid enters the heat exchanger.

One particularly useful hot fluid is the water from a geothermal well which acts as a carrier for the heat that exists in the interior of the earth. When water from a geothermal well is the hot fluid, the water may first be passed through a flash chamber to separate any steam. The steam may then be applied directly to a heat exchanger for heating the working fluid, while the hot liquid or hot water is applied to a direct contact heat exchanger. The condensate at the output of the heat exchanger to which the steam is applied may be combined with the hot liquid at the input to the direct contact heat exchanger. Alternatively, the steam may be passed through successive heat exchangers and condensed with the condensate being substantially pure distilled water which may be recovered and used. The heat transfer fluid is advantageously circulated in a closed loop while the working fluid is also advantageously circulated in a second closed loop. The working fluid is superheated in the heat exchangers that are common to the first and second closed loops. The working fluid is thereafter expanded in a power extracting gas expansion device where it is reduced in pressure and temperature. The remaining heat in the working fluid at the output of the power extracting device may be employed in a heat exchanger to heat the working fluid in its liquid state while the working fluid is circulated in the second closed loop.

Either after passing through the power extracting device or a heat exchanger at the output of the power extracting device, the working fluid is condensed and returned to the heat exchangers as a liquid.

As an alternative to a separate closed loop for the heat transfer fluid and the use of a direct contact heat exchanger, a heat transfer fluid having an oily character is added directly to the hot fluid. The mixture is passed through one or more surface heat exchangers in heat exchange relationship with a working fluid to superheat the working fluid for extraction of energy. The oily substance in the hot fluid coats the surface of the surface contact heat exchangers to prevent mineral deposition therein. The heat in the hot fluid is transferred to the surface film of heat transfer fluid and then from the heat transfer fluid to the working fluid.

BRIEF DESCRIPTION OF THE DRAWINGS

The above and other advantages of this invention may be understood more fully and clearly upon consideration of the following specification and drawings, in which.

DESCRIPTION OF THE PREFERRED EMBODIMENTS

Geothermal heat and some waste heat may be efficiently converted to mechanical energy and finally electrical energy, as disclosed in my above-identified copending application by using a fluid containing the usable energy in the form of heat energy to superheat a working fluid that is expanded in a power extracting gas expansion device.

There are many areas where hot fluid can be recovered from a geothermal well at a temperature up to approximately 450°F. or higher. In some areas, the hot fluid will flow naturally to the surface while in others, pumping must be resorted to. In any event, the heat in the hot fluid can be recovered for the production of power. Additionally, there is considerable waste heat from oil refineries, atomic energy plants, etc., in the same temperature range as the fluid from a geothermal well that can be converted to useful power. A large amount of this heat may be converted to useful power by superheating a working fluid with the heat energy and expanding the working fluid vapors so produced through a prime mover. The working fluid exhausting from the prime mover can be condensed and the liquid passed in heat exchange relationship with the fluid at the output of the prime mover to recover some of the heat remaining in the fluid after expansion. The working fluid may be recycled in the system. The temperature of the hot fluid decreases when passing in heat exchange relationship with the working fluid and is typically 130°F. to 200°F. at the output of the lowest temperature heat exchanger. The cooled fluid can be passed back into the earth or, alternatively, treated to recover any valuable minerals dissolved therein.

Figure 1:
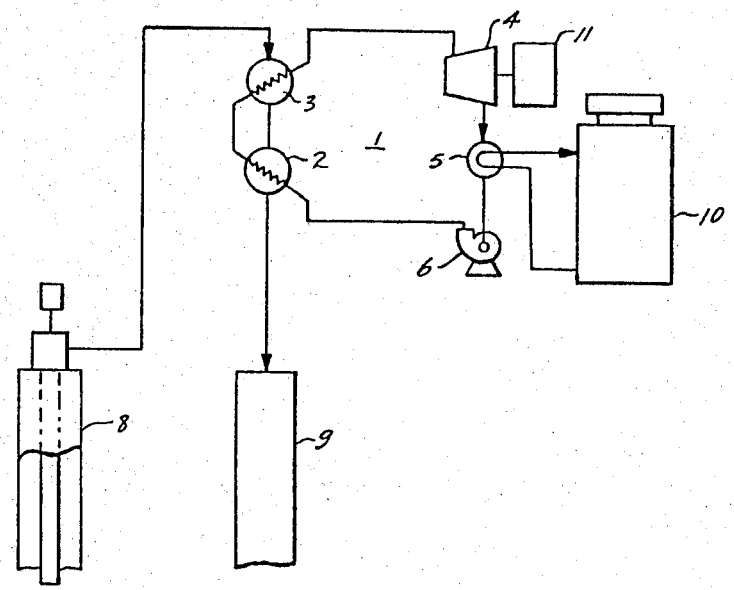
FIG. 1 is a process flow diagram for the extraction of useful energy from the heat in a hot fluid.

A process flow diagram for such a process for recovering heat from a hot fluid extracted from a geothermal well as disclosed in my copending application is shown in FIG. 1. An operating or working fluid in a closed loop 1 is converted to a vapor in one or more heat exchangers, represented by a first exchanger 2 and a second heat exchanger 3. Both of these exchangers have a solid interface surface for the transfer of heat from the hot fluid to the working fluid. The working fluid is advantageously given sufficient superheat to avoid condensation in a prime mover having at least 75 percent conversion efficiency. Thereafter, the vapors are expanded in a prime mover or power extracting gas expansion device, such as a turbine 4, which is coupled to the output of the heat exchanger 3. The working fluid exhausts from the turbine 4 at a lower pressure and is applied to a condenser 5 for de-superheating and condensing thereof. A pump 6 is connected between the condenser 5 and heat exchanger 2 for circulating the working fluid in the system. The working fluid is cooled in the condenser 5 by the passage of water from a cooling tower 10 through the condenser 5. The turbine 4 drives a utilization means, such as a generator 11, for converting the extracted heat to useful power. There may be a plurality of condensers as well as heat exchangers. In any event, the hot fluid extracted from a geothermal well 8 is passed through the heat exchangers 3 and 2 in heat exchange relationship with the working fluid to transfer heat from the hot fluid to the working fluid. Thereafter, the hot fluid may be returned to the earth, as representatively shown by the well 9 in FIG. 1, or may be further processed for the extraction of minerals in the hot fluid.

Where the hot fluid has salts and other dissolved minerals therein, such as exists with the hot fluid from geothermal wells in the Imperial Valley of California, scaling may occur by the adherence of the salts or other minerals to the surfaces of the heat exchangers. This can greatly increase the pressure drop in the system and reduce the heat exchange transfer rate and substantially reduce the overall efficiency of the system.

In order to overcome these difficulties, the hot fluid which acts as a carrier from the primary source of energy is, in accordance with this invention, passed in heat exchange relationship by direct contact with a heat transfer fluid. For purposes of illustration, it is assumed that the hot fluid comes from a geothermal well 21 and may contain a large amount of salts and dissolved minerals. Additionally, the geothermal well fluid at the surface may be at a temperature of 350°F. or more and contain a mixture of steam and water. In this case, the fluid is advantageously passed through a flash chamber 22 for the separation of the steam and water. The steam, which has relatively few impurities therein, may be passed directly through a heat exchanger 23 for the heating of the working fluid in the system. The condensate output from the heat exchanger 23 may be combined with the hot water at the output of the flash chamber 22 and passed in combination into a direct contact heat exchanger 25.

The hot water from the flash chamber 22 is admitted at the top of a direct contact heat exchanger 25 where it comes in heat exchange relationship by direct contact with a heat transfer fluid that is admitted at the bottom of the heat exchanger 25 through a flow means 26.

The heat transfer fluid which has a low specific gravity relative to the hot fluid admitted at the top of the heat exchanger 25 passes upwardly through the chamber in direct contact with the hot fluid or water that flows from the top to the bottom of the heat exchanger 25. The hot fluid, after giving up its heat in the heat exchanger 25, is removed through an opening 27 near the bottom of the exchanger and is either returned to the earth through a well 28 or further processed to remove the salts and other minerals that are carried out of the heat exchanger 25 by the fluid. Heat exchanger 25 is maintained at a pressure above the vapor pressure of the water or hot fluid at the imput temperature of the fluid to the exchanger 25.

The direct contact heat exchanger 25 may have a conventional design with alternating trays 18 protruding from opposite sides to break up the flow of the water and to increase the surface contact between the heat transfer fluid and the water. The water may be at any selected level within the exchanger 25 such as is represented by line 19 in the exchanger 25.

The heat transfer fluid advantageously has a boiling point at the operating pressures of the system above the input temperature of the hot fluid. Also, the heat transfer fluid is substantially insoluble in the hot fluid under the operating pressures and temperatures of the system at the colder end of the direct contact heat exchanger.

One particularly good heat transfer fluid when geothermal well water is the hot fluid, is gas oil. Gas oil has a boiling range of about 450°F. to 800°F. which is above the highest temperature generally experienced with water from a geothermal well. Additionally, the gas oil has the desired specific gravity and also tends to coat the surfaces of the heat exchangers with an oily film which tends to prevent the formation of scale by any salts or other minerals that may be carried into the system by the heat transfer fluid.

Figure 2:
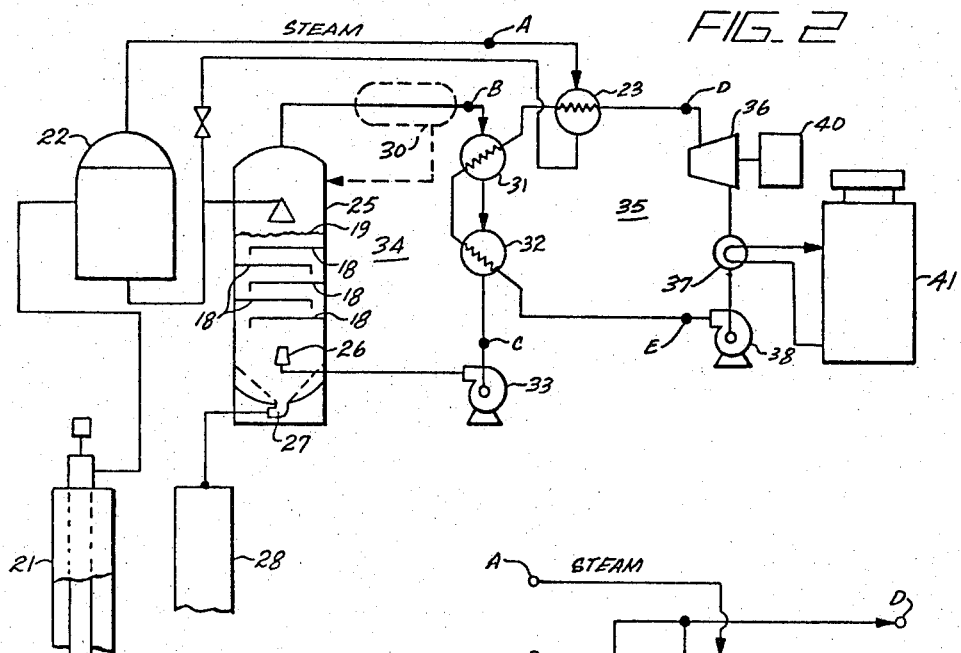
FIG. 2 is a process flow diagram for the efficient extraction of useful energy from hot fluids which may contain salts and other dissolved minerals in accordance with the present invention.

If, in operation it is found that water containing salts or other minerals is being carried from the heat exchanger 25 by the heat transfer fluid, a settling chamber 30, shown in dotted lines in FIG. 2, may be placed in the flow path of the heat transfer fluid at the top of the heat exchanger 25 to recover the carryover. Settling chamber 30 will collect most of the water containing salts or other minerals that may be carried by the heat transfer fluid. The collected water and solids are returned to heat exchanger 25 for eventual removal at the bottom thereof. The heat transfer fluid passes through one or more heat exchangers, which are represented by heat exchangers 31 and 32 connected in series flow at the output of the heat exchanger 25. After passing through the heat exchangers, representatively shown by heat exchangers 31 and 32, the heat transfer fluid enters a pump 33 which circulates the heat transfer fluid in the first closed loop 34. The heat in the heat transfer fluid is transferred to the working fluid that circulates in the second closed loop 35. Heat exchangers 31 and 32 have solid interface surfaces for the transfer of the heat to the working fluid. The working fluid has a boiling point below the temperature of the heat transfer fluid at the input to exchanger 31. The working fluid may be given sufficient superheat by the heat transferred from the heat transfer fluid to avoid condensation in a prime mover that has at least a 75 percent conversion efficiency. The working fluid is expanded in the power extracting gas expansion device, which is representatively shown by the turbine 36, and is then passed through a condenser 37 for condensation therein. The turbine 36 is coupled to a utilization means 40 which may advantageously be a generator for the generation of electricity.

The working fluid as a liquid at the output of the condenser 37 enters a pump 38 which circulates the working fluid in the second closed loop 35. The working fluid is cooled down and condensed in the condenser 37 by a cooling fluid that releases the absorbed heat in a cooling tower 41 which may advantageously operate at atmospheric conditions.

With water from a geothermal well as the hot fluid applied to the direct contact heat exchanger 25, gas oil as the heat transfer fluid and isobutane as the working fluid, the following temperatures and pressures may be advantageously employed in the system. A typical temperature for geothermal well water at the input of the direct contact heat exchanger 25 is 350°F. To avoid vaporization of this water in the heat exchanger 25, the heat exchanger is maintained at a pressure of about 135 psia. The gas oil having a boiling point above the entering temperature of the hot fluid remains a liquid throughout the first closed loop 34. The gas oil may leave the heat exchanger 25 at a temperature of approximately 340°F. for heating the working fluid in the heat exchangers 31 and 32. Isobutane has the required boiling point at the operating pressures of the system of the second closed loop 35 that is below the temperature of the heat transfer fluid in the first closed loop 34.

Advantageously, the isobutane is given sufficient superheat in passing through heat exchangers 31 and 32 to avoid condensation in a prime mover having 75 percent conversion efficiency. The operating pressure at the input to the prime mover 36 may advantageously be above the critical pressure of the working fluid, such as 600 psia for isobutane, or it may be below the critical pressure.

In one embodiment, with a pressure of 600 psia at the input to the turbine 36 and a temperature of 320°F. and a prime mover having 85 percent conversion efficiency, 11,200 horesepower may be developed at the output of the prime mover 36 with a flow rate of 843,000 lbs. per hour of isobutane. The temperature and pressure of the working fluid leaving the prime mover 36 will be approximately 175°F. and 72 psia, respectively.

Water from a cooling tower 41 operating at a temperature of 80°F. can cool the working fluid of isobutane to a temperature of 100°F. to liquefy the working fluid. The working fluid then enters pump 38 which circulates the fluid through the second closed loop 35.

The fluid exiting the flash chamber 22 as steam may be substantially pure so that it may be desirable to recover the distilled water at the output of the heat exchanger. A process flow diagram, where this distilled water is recovered is shown in FIG. 3, with the portion of the process of FIG. 2 to be replaced by the process flow diagram of FIG. 3 being within the junction points A, B, C, D and E in FIG. 2.

Figure 3:
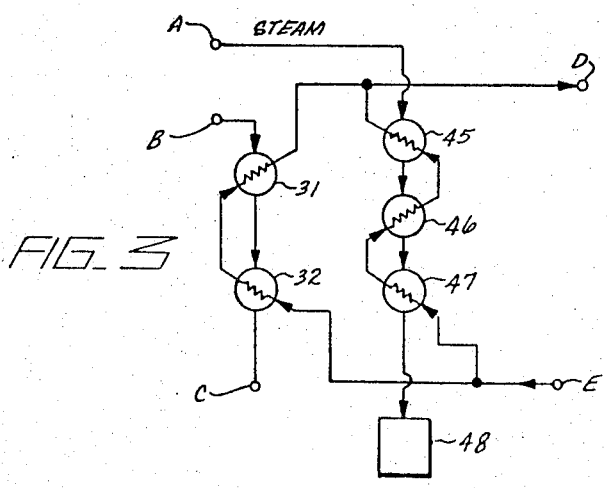
FIG. 3 is a portion of a process flow diagram that may replace a portion of the diagram of FIG. 2 at the lettered junctions thereof.

In FIG. 3 the steam from the flash chamber 22 is applied to point A where it passes in succession through one or more heat exchangers represented by exchangers 45, 46 and 47 in heat exchange relationship with a portion of the working fluid. The remainder of the working fluid is passed in heat exchange relationship with the heat transfer fluid in heat exchangers 31 and 32. The flow rates of the working fluid through the two paths are adjusted so that the working fluid from each path is at the same temperature when combined at the output of the heat exchangers 31 and 45.

The steam from flash chamber 22 that is applied to heat exchanger 45 is desirably condensed therein while giving up only the latent heat. Thereafter, the liquid gives up much of the remaining heat to the working fluid in heat exchangers 46 and 47. The cooled substantially pure distilled water may then be recovered in a collector means 48 for subsequent use.

As an alternative to a second closed loop with a heat transfer fluid therein and the use of a direct contact heat exchanger, a heat transfer fluid having an oily character may be added directly to the hot fluid. A process flow diagram for this process for recovering heat energy in a fluid is shown in FIG. 4 of the drawing.

Again for purposes of illustration, it is assumed that the hot fluid comes from a geothermal well 51 and that it may contain dissolved salts and other minerals. The fluid from the well may be pumped or steam lifted to the surface for use. If the fluid contains steam, it may be separated by use of a flash chamber as is shown in FIG. 2. The liquid is injected with an oily substance from a reservoir 52 before passing through any heat exchangers or other components of the system. The substance may be oil with additives to increase the adherence of the substance to metal surfaces.

Figure 4:
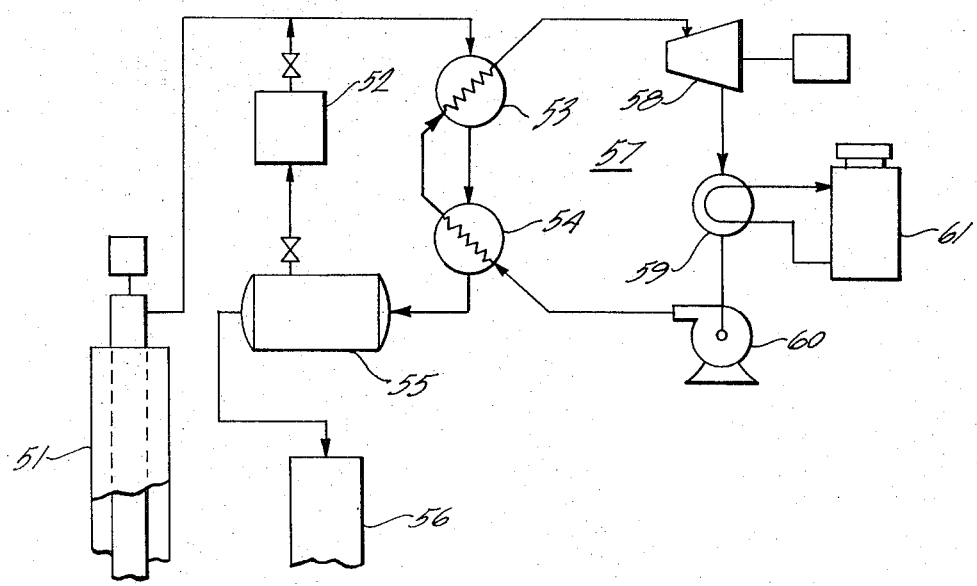
FIG. 4 is a process flow diagram of an alternative process for the extraction of useful energy from hot fluids which may contain salts and other dissolved minerals in accordance with this invention.

The mixture of the brine and oily substance passes into one or more surface contact heat exchangers, representatively shown by exchangers 53 and 54 in FIG. 4. The oily substance coats the surfaces of each exchanger to prevent contact therewith by the brine to prevent deposition of any of the minerals dissolved in the water. Since the oily substance provides a film on the heat exchange surface of each exchanger, the heat from the brine or water is transferred to the oily substance and from the oily substance, which functions as a heat transfer fluid, to the working fluid.

The oily substance is replenished from the reservoir 52. Preferably, the brine at the input to the heat exchangers is kept saturated with the oily substance so that the brine does not remove any of the substance from the surface of the exchanger.

The oily substance is recovered in the separator 55 and is recirculated by being reinjected into the brine at the input to the first heat exchanger 53. After the water and oily substance are separated, the water may be returned to the earth by applying it to a reinjection well 56 as shown in FIG. 4. Alternatively, the brine may be processed to recover one or more of the minerals before disposing of the water.

The working fluid may advantageously be circulated in a closed loop 57 and passes through the exchangers 53 and 54 for heating by the hot fluid through the medium of the oily substance. The working fluid is preferably superheated in the exchanger 53 and is passed through a power extracting gas expansion device 58 for recovery of the energy therein. As in the process of FIG. 2, the working fluid is condensed in a condenser 59 and circulated in the closed loop by a pump 60.

The working fluid may be condensed in condenser 59 by passing water from a cooling tower 61 operating at atmospheric conditions therethrough. The power extracting device 58 drives a utilization means 62 for the useful recovery of the heat energy in the input fluid.

Various changes may be made in the details of the process without departing from the spirit and scope of the invention as defined by the appended claims.

What is claimed is:

1. A method of recovering heat from the liquid portion of a geothermal fluid which may contain salts and other dissolved minerals comprising the steps of:
    passing the geothermal liquid in heat exchange relationship in a direct contact heat exchanger with a first fluid functioning as a heat transfer fluid to heat the first fluid;
    passing the heated first fluid in heat exchange relationship with a second fluid to cause the second fluid to be in a gaseous state; and
    expanding the gaseous second fluid in a power extracting gas expansion device.

2. The method in accordance with claim 1 further comprising the additional step of circulating the first fluid in a closed loop.

3. The method in accordance with claim 1 comprising the further steps of condensing the second fluid after power extraction and circulating the second fluid in a closed loop.

4. The method in accordance with claim 1 wherein the first fluid has a boiling point above the highest temperature of the geothermal fluid while passing in heat exchange relationship with the first fluid.

5. The method in accordance with claim 4 wherein the pressure in the direct contact heat exchanger is above the pressure at which the geothermal fluid can vaporize at the entering temperature of the geothermal fluid.

6. The method in accordance with claim 1 wherein the first fluid has a specific gravity sufficiently below that of the geothermal fluid so that the first fluid will rise in a chamber in which the geothermal fluid is passing from the top to the bottom at the operating pressures of the system.

7. The method in accordance with claim 1 wherein the second fluid has a boiling point below the boiling point of the first fluid.

8. The method in accordance with claim 1 comprising the further step of superheating the second fluid with sufficient superheat to avoid condensation in a prime mover with at least 75 percent conversion efficiency.

9. The method in accordance with claim 1 wherein the second fluid has a specific heat as a vapor that is equal to at least 50 percent of the specific heat of the second fluid as a liquid over the same temperature range under the operating pressures of the system.

10. The method in accordance with claim 1 wherein the first fluid has a specific gravity below that of the geothermal fluid and is substantially insoluble in the geothermal fluid under the operating temperatures and pressures of the system at the cold end of the direct contact heat exchanger.

11. The method in accordance with claim 1 wherein the heat transfer fluid is selected so that the geothermal liquid and heat transfer fluid are substantially immiscible.

12. The method in accordance with claim 1 wherein the heat transfer fluid is an oily substance that coats the surfaces of the direct contact heat exchanger to prevent the formation of scale by any salts or other minerals that may be carried into the system by the heat transfer fluid.

13. The method in accordance with claim 1 wherein the heat transfer fluid is an oily substance that coats the surfaces of the heat exchangers in the system.

14. The method in accordance with claim 1 comprising the further step of removing any salts or other minerals that may be carried over by the heat transfer fluid after passing in heat exchange relationship with the geothermal liquid.

15. Method of recovering heat from a fluid comprising the steps of:
    passing the hot fluid through a direct contact heat exchanger at a pressure above the vapor pressure of the entering hot fluid;
    passing a heat transfer fluid through the direct contact heat exchanger with the second fluid having a specific gravity sufficiently lower than the specific gravity of the hot fluid to pass upward through the hot fluid;
    the heat transfer fluid and the hot fluid being immiscible under the operating conditions in the direct contact heat exchanger;

passing the heated heat transfer fluid in heat exchange relationship with a working fluid operating in a closed loop;

expanding the heated working fluid in a power extracting gas expansion device;

condensing the expanded working fluid, and pumping the working fluid through the closed loop.

16. A power generation system comprising:

a heat transfer fluid circulating in a first closed loop;

a working fluid circulating in a second closed loop;

the working fluid having a boiling point below the boiling point of the heat transfer fluid;

a direct contact heat exchanger in the first closed loop;

means for passing a hot fluid through the direct contact heat exchanger;

the hot fluid being immiscible with respect to the heat transfer fluid and having a specific gravity greater than the specific gravity of the heat transfer fluid;

the first closed loop including one or more heat exchangers through which the heat transfer fluid flows; and the second closed loop including means for passing the working fluid through the heat exchanger of the first closed loop in heat exchange relationship with the heat transfer fluid;

a power extracting gas expansion device;

a condenser; and a pump for circulating the working fluid in the second closed loop.

17. A process for recovering heat energy from the liquid portion of a geothermal fluid which may contain salts and other dissolved minerals comprising the steps of:

conducting a stream of fluid from a geothermal well to an upper position remote from the well;

injecting an oily substance into the fluid remote from the well;

passing the fluid and oily substance in combination in heat exchange relationship with a working fluid;

superheating the working fluid with heat from the geothermal fluid;

expanding the working fluid in a power extracting gas expansion device;

condensing the working fluid after expansion; and repeating the steps in a continuous process.

18. A process in accordance with claim 17 further comprising the additional steps of recovering the oily substance from the geothermal fluid after passing the geothermal fluid and oily substance in combination in heat exchange relationship with the working fluid and re-injecting the oily substance into the geothermal fluid before passing the geothermal fluid in heat exchange relationship with the working fluid.

19. A process for recovering heat energy from a hot liquid comprising the steps of:

combining the hot fluid with an oily substance, passing the mixture through one or more heat exchangers, coating one side of the heat exchange surfaces with a film of the oily substance, passing a working fluid through the heat exchangers to be heated by the heat energy in the hot fluid through the medium of the film, superheating the working fluid with heat from the hot fluid, and expanding the working fluid in a power extracting gas expansion device.

20. The process in accordance with claim 19 wherein the hot fluid is saturated with the oily substance.

* * * * *